US010437577B2

(12) United States Patent
Balar et al.

(10) Patent No.: US 10,437,577 B2
(45) Date of Patent: Oct. 8, 2019

(54) SYSTEMS AND METHODS FOR MOBILE APPLICATION INSTALLATION (71) Applicant: Verizon Patent and Licensing Inc., Arlington, VA (US)

(72) Inventors: Yash Devshibhai Balar, Somerset, NJ (US); Gopi Nath Sapra, Edison, NJ (US); Bindu Balan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/887,710

(22) Filed: Feb. 2, 2018

(65) Prior Publication Data

US 2019/0243627 A1    Aug. 8, 2019

(51) Int. Cl.
*G06F 8/61* (2018.01)
*H04L 29/08* (2006.01)
*G06F 3/0481* (2013.01)
*G06F 3/0482* (2013.01)

(52) U.S. Cl.
CPC .............. *G06F 8/61* (2013.01); *H04L 67/34* (2013.01); *G06F 3/0482* (2013.01); *G06F 3/04817* (2013.01); *H04L 67/02* (2013.01)

(58) Field of Classification Search
USPC ........................................................ 717/168
See application file for complete search history.

(56) References Cited

U.S. PATENT DOCUMENTS

| | | | | |
|---|---|---|---|---|
| 5,751,956 A | * | 5/1998 | Kirsch | G06F 17/30876 707/E17.112 |
| 9,135,445 B2 | * | 9/2015 | Kay | H04L 67/34 |
| 2002/0157089 A1 | * | 10/2002 | Patel | G06F 8/65 717/178 |
| 2007/0233782 A1 | * | 10/2007 | Tali | G06F 8/61 709/203 |
| 2013/0104219 A1 | * | 4/2013 | Kumar | H04L 9/321 726/9 |
| 2014/0297402 A1 | * | 10/2014 | Soudak | G06Q 30/0246 705/14.45 |
| 2015/0186913 A1 | * | 7/2015 | Mann | G06Q 30/0219 705/14.21 |
| 2017/0075670 A1 | * | 3/2017 | Lazar | G06F 8/61 |

* cited by examiner

*Primary Examiner* — Wei Y Zhen
*Assistant Examiner* — Brahim Bourzik (57) ABSTRACT A system described herein may facilitate the retrieval and installation of an application (or "app") at a user device, based on a single user interaction (e.g., a single click, double click, selection, etc.). A one-touch app install ("OAI") system may communicate with an application programming interface ("API") that is installed on the user device to provide an app installation package for a requested app. the API may have appropriate permissions with an operating system of the user device to install the app on the user device.

20 Claims, 9 Drawing Sheets

SYSTEMS AND METHODS FOR MOBILE APPLICATION INSTALLATION

BACKGROUND

Applications (sometimes referred to as "apps") for devices such as mobile telephones, tablet computers, etc., may be presented to users for download and installation. For example, an app may be advertised on an individual's social networking account, and the individual may decide to install the app. Typically, this process necessitates several interactions (e.g., clicks or other selections) by the individual once the individual has decided to install the app.

DETAILED DESCRIPTION OF THE PREFERRED EMBODIMENTS

The following detailed description refers to the accompanying drawings. The same reference numbers in different drawings may identify the same or similar elements.

Figure 1:
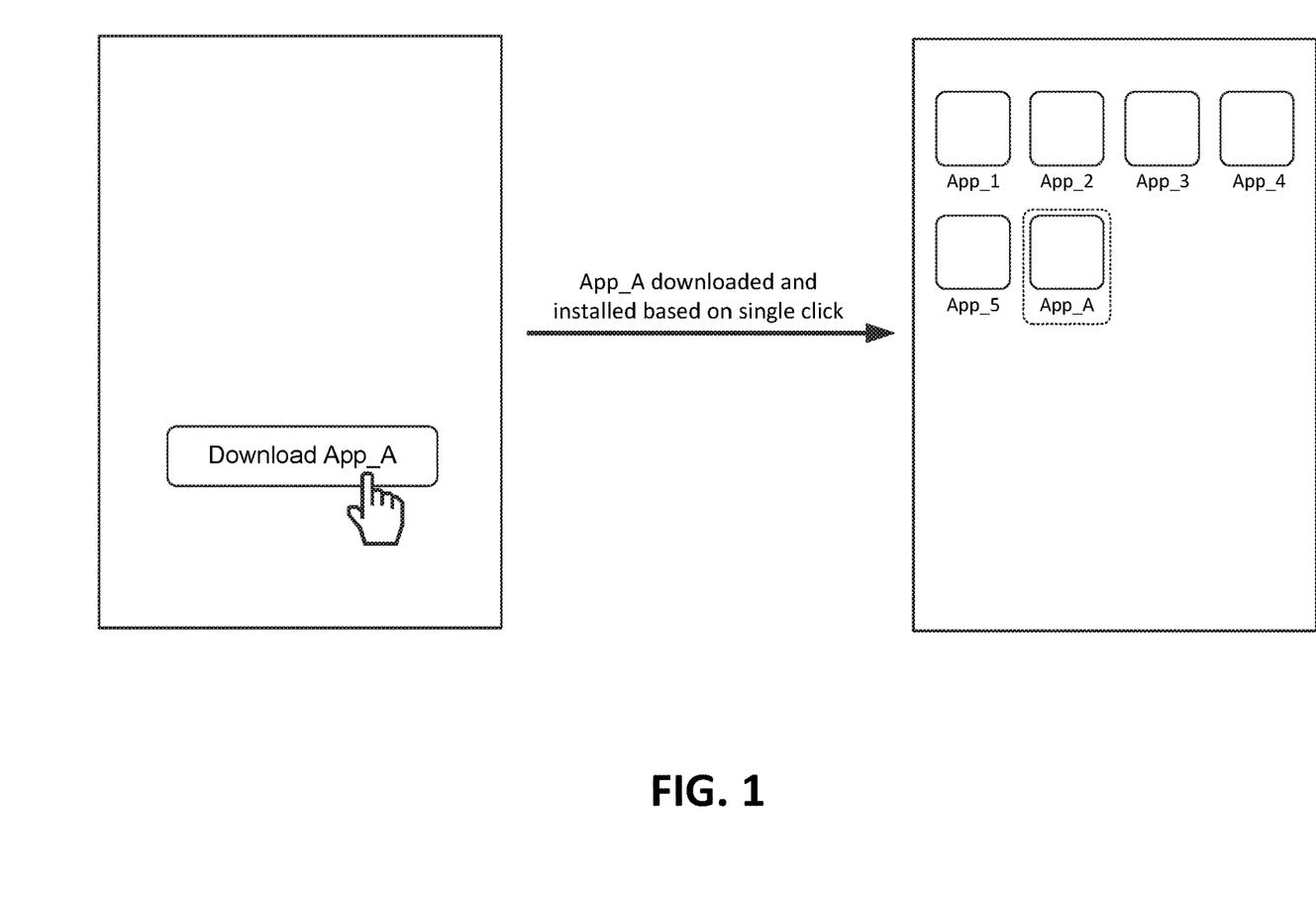
FIG. 1 illustrates an overview of one or more embodiments described herein, in which an app can be installed based on a single user interaction.

Systems and/or methods, as described herein, may provide for the installation of applications (referred to as "apps") on a user device (e.g., a mobile telephone, a tablet computer, or the like) via a single user interaction (e.g., via one "touch" of a touchscreen). For example, as shown in FIG. 1, a graphical user interface ("GUI") presented on a user device may include a button ("Download App_A"). The button may, for example, be associated with content promoting App_A, and may be presented via a social networking account of a user of the user device, on a web page, in an email, etc. In accordance with some embodiments described herein, selection of the button may cause App_A to be downloaded and installed on the user device, without any further interaction from the user.

Figure 2:
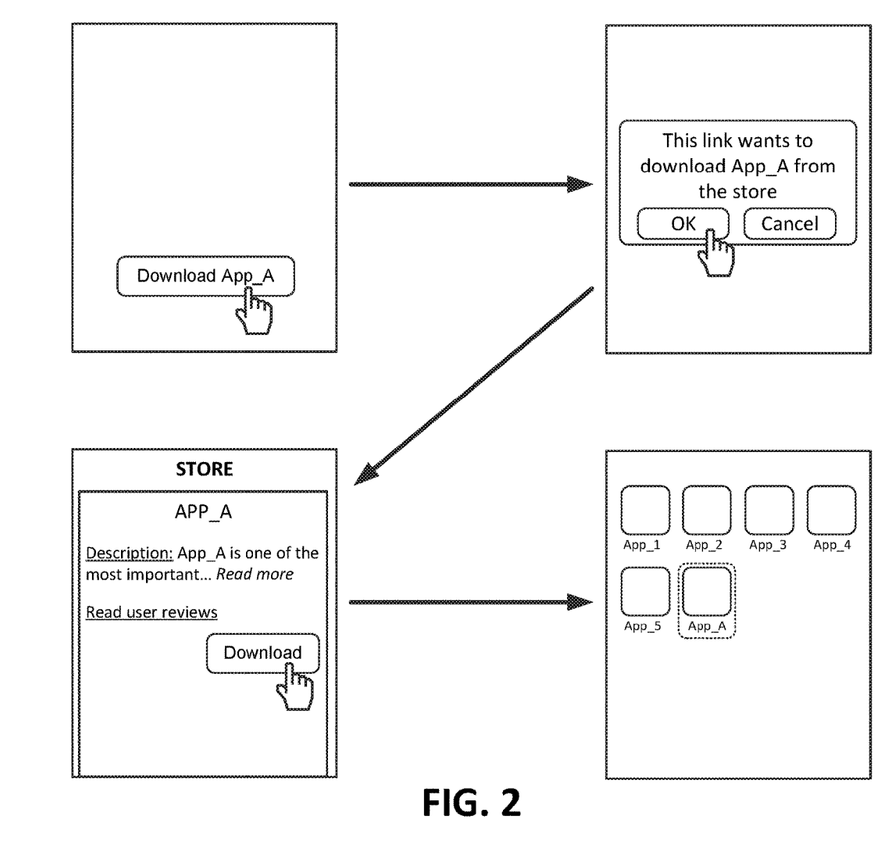
FIG. 2 illustrates a scenario in which multiple user interactions are needed to install an app.

In contrast, FIG. 2 illustrates a solution in which a user first selects to install App_A, and then is presented with a dialog requesting confirmation to open a "store" application (e.g., where the "store" application is an application from which apps can be browsed and downloaded). Once the user selects "OK" on the confirmation, a page in the store application is opened for App_A (e.g., where reviews, thumbnails of App_A, developer comments, etc. are presented). The page for App_A may also include a "download" button. Upon selection of this button, App_A may finally be downloaded.

Accordingly, the process shown in FIG. 1 reduces the number of interactions, increases app adoption and engagement, verifies security, and reduces the number of user instructions as compared to the process shown in FIG. 2. Additionally, because of the reduced number of user interactions, users of the process detailed in FIG. 1 are more likely to complete the installation, thus resulting in higher user engagement.

Figure 3:
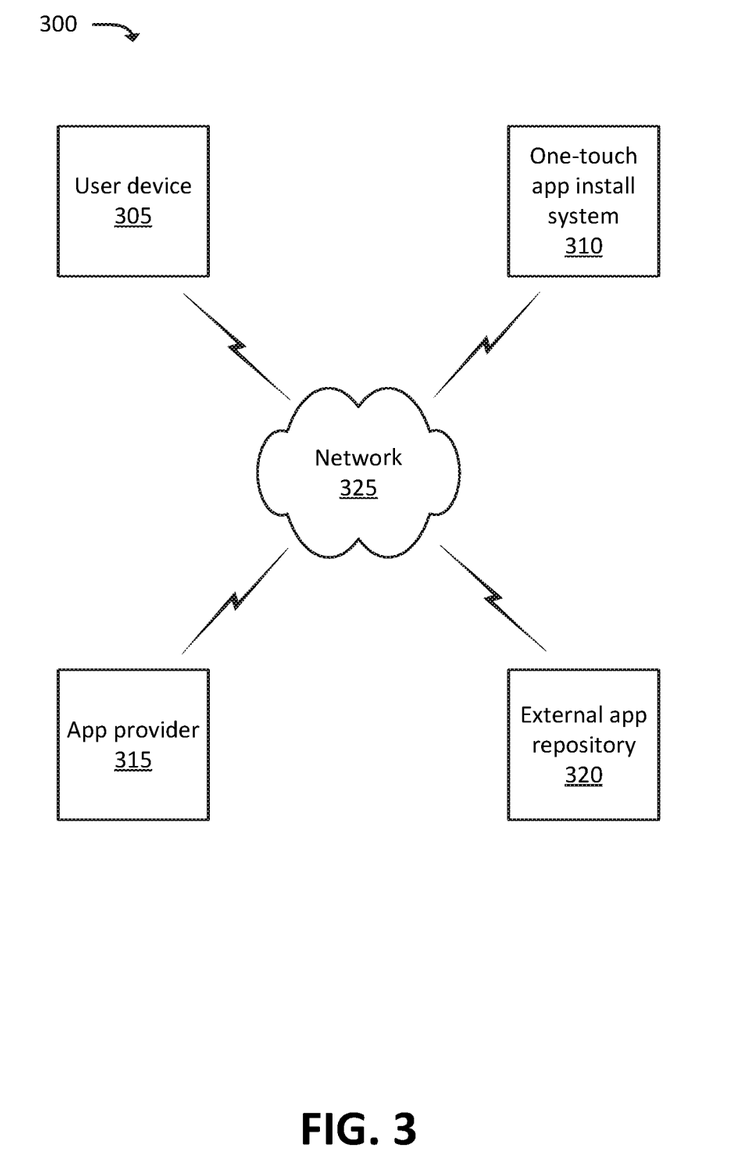
FIG. 3 illustrates an example environment in which one or more embodiments, described herein, may be implemented.

FIG. 3 illustrates an example environment 300, in which one or more embodiments, described herein, may be implemented. As shown in FIG. 3, environment 300 may include user device 305, OAI system 310, app provider 315, external app repository 320, and network 325. The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

User device 305 may include any computation and communication device that is capable of communicating with one or more networks (e.g., network 325). For example, user device 305 may include a device that receives content, such as web pages (e.g., that include text content and/or image content), streaming audio and/or video content, and/or other content, via an Internet connection and/or via some other delivery technique. User device 305 may also receive user interactions (e.g., touches on a touchscreen, "clicks" via an input device such as a mouse, etc.). In some implementations, user device 305 may be or may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

OAI system 310 may include a device (or a collection of devices) that facilitate the installation of apps at user device 305, in accordance with some embodiments. For instance, as described below, OAI system 310 may communicate with user device 305, app provider 315, and/or external app repository 320 to facilitate the installation of apps via a single user interaction at user device 305 (e.g., a single touch, "click," etc.). In some embodiments, OAI system 310 may include one or more storage devices that store app installation packages (e.g., one or more files that, when provided to user device 305, cause an app to be installed by user device 305). In some embodiments, as described below, OAI system may perform authentication and/or other security processes when registering apps and/or app providers (e.g., app provider 315) that make use of the functionality provided by OAI system 310.

App provider 315 may include a device (or a collection of devices) that provide information regarding apps that can be installed at user device 305. App provider 315 may be associated with, for example, an app developer, a content provider, and/or some other entity that provides apps to user device 305. App provider 315 may communicate with user device 305, OAI system 310, and/or external app repository 320 to facilitate the installation of apps via a single user interaction at user device 305 (e.g., a single touch, "click," etc.

External app repository 320 may include a device (or a collection of devices) that store app installation packages. In some embodiments, external app repository 320 may be "external" to OAI system 310, in that OAI system 310 may access resources stored by external app repository 320 via network 325 (e.g., using a Uniform Resource Locator ("URL") and/or some other communication technique).

Network 325 may include one or more radio access networks ("RANs"), via which user device 305 may access one or more other networks or devices, a core network of a wireless telecommunications network, an IP-based packet data network ("PDN"), a wide area network ("WAN") such as the Internet, a private enterprise network, and/or one or more other networks. In some implementations, network 325 may be, or include, a cellular network, such as a Long-Term Evolution ("LTE") network, a Third Generation ("3G") network, a Fourth Generation ("4G") network, a Fifth Generation ("5G") network, a Code Division Multiple Access ("CDMA") network, etc. User device 305 may connect, via network 325, to data servers, application servers, other user devices 305, etc. Network 325 may be connected to one or more other networks, such as a public switched telephone network ("PSTN"), a public land mobile network ("PLMN"), and/or another network.

Figure 4:
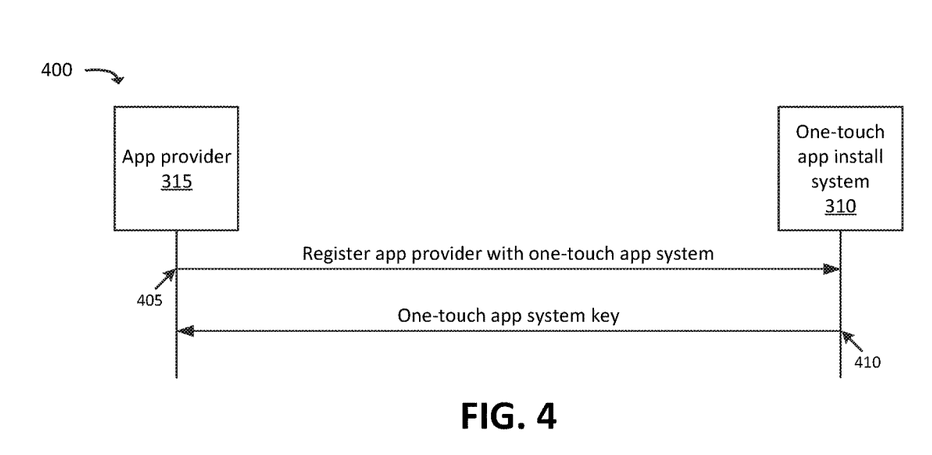
FIG. 4 illustrates an example process for registering an app provider with a one-touch app installation ("OAI") system.

FIG. 4 illustrates an example process 400 for registering app provider 315 with OAI system 310. App provider 315 may register (at 405) with OAI system 310. For example, OAI system 310 may provide a user interface, such as a website, a portal, or some other user interface, via which an administrator associated with app provider 315 may access. In some embodiments, an entity associated with app provider 315 (e.g., a company, an owner and/or operator of app provider 315, etc.) may establish an agreement with an entity associated with OAI system 310, whereby the services of OAI system 310 are used to provide apps to users in the manner described herein. Once app provider 315 has been registered with OAI system 310, OAI system 310 may provide (at 410) a one-touch app system key, which app provider 315 may subsequently use for authentication with OAI system 310.

Figure 5:
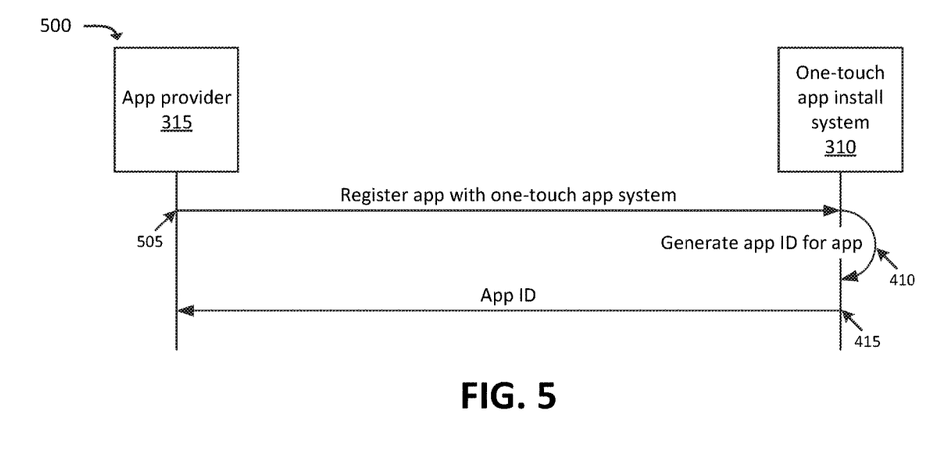
FIG. 5 illustrates an example process for registering an app with the OAI system.

FIG. 5 illustrates an example process 500 for registering an app with OAI system 310. As shown, app provider 315 may register (at 505) an app with OAI system 310. For example, app provider 315 may provide an app name or other identifier, a URL associated with the app, an app installation package, or the like to OAI system 310. OAI system 310 may register the app, which may include, for example, establishing a monetary agreement or partnership with an owner/operator of app provider 315. OAI system 310 may generate an identifier (referred to herein as "app ID") for the registered app. The app ID may be a hash value based on the name of the app, and/or may be generated in some other way (e.g., random or pseudorandom string generation). OAI system 310 may provide (at 510) the app ID to app provider 315 for later use, as described below.

Figure 6:
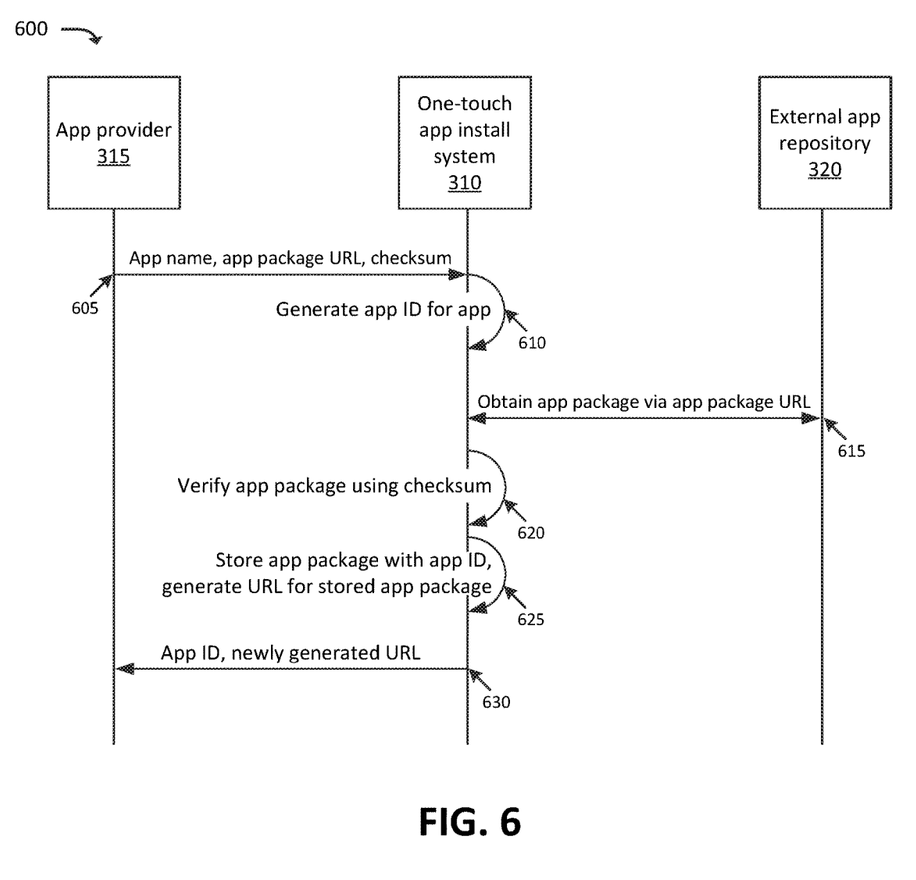
FIG. 6 illustrates an example process for the retrieval and storage of an app, by the OAI system, from an external app repository.

FIG. 6 illustrates an example process 600 for OAI system 310 obtaining and storing an app from an external repository (e.g., a repository that is not owned and/or operated by an entity associated with OAI system 310). As shown, app provider 315 may provide (at 605) a name of an app, a URL at which an installation package for the app is stored, and a checksum for the app installation package, to OAI system 310. The installation package may be a file, or set of files, which can be used by user device 305 to install the app. The URL may point to the app installation package as stored on external app repository 320. In some embodiments, app provider 315 may provide (either prior to 605, or concurrently with 605) authentication information to OAI system 310, so that OAI system 310 can verify that app provider 315 is authorized to register apps for the services provided by OAI system 310. The authentication information may include a one-touch app system key (e.g., as discussed above with respect to FIG. 4), a user name and password combination, and/or some other authentication information.

OAI system 310 may generate (at 610) an app ID for the app. For example, OAI system 310 may generate the app ID by using a hashing function based on the app name, app installation package URL, and/or checksum, and/or may generate the app ID using any other suitable technique. OAI system 310 may obtain (at 615) the app installation package (sometimes referred to in the figures as "app package") for the app by using the app installation package URL (provided at 605). The app installation package may be obtained from external app repository 320 which may, in some embodiments, be owned and/or operated by a separate entity from an owner and/or operator of OAI system 310.

OAI system 310 may verify the app installation package using the checksum (provided at 605). Once the app installation package has been verified, OAI system 310 may store the app installation package in a manner that associates the app installation package with the app ID (generated at 610). OAI system 310 may also generate a URL for the stored app installation package. The newly generated URL may be a link to one or more server devices associated with OAI system 310. In this manner, when the app installation package is to be retrieved in the future (e.g., as described below), the app installation package can be retrieved from OAI system 310 rather than from some external device, such as external app repository 320. This may result in faster retrieval of the app installation package, thus resulting in an enhanced user experience. OAI system 310 may output (at 630) the newly generated URL, along with the app ID, to app provider 315. As described below, app provider 315 may provide the newly generated URL to user device 305 in order to facilitate the installation of the app on user device 305.

Figure 7:
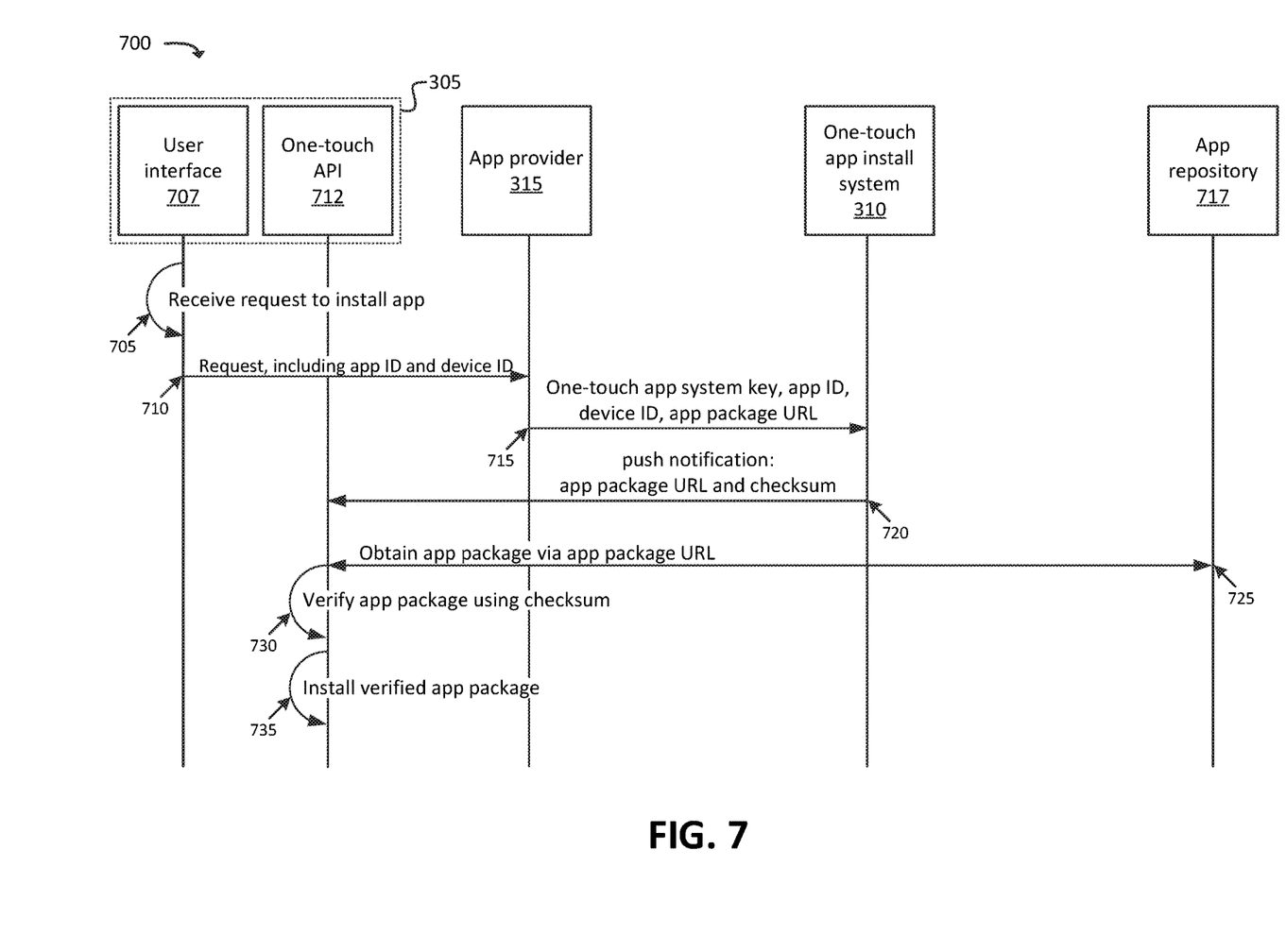
FIGS. 7-9 illustrate example processes for providing an app based on a single user interaction.

FIG. 7 illustrates an example process 700 for obtaining and installing an app on user device 305 based on a single user interaction. As shown, user device 305 may include user interface 707 and one-touch API 712. User interface 707 may be, or include, a GUI component of a web browser, a social networking app, a gaming app, a video streaming app, and/or some other application being executed by user device 305. In some embodiments, user interface 707 may be associated with an application that is not a "store" application (e.g., a native application that is typically installed as part of an operating system of user device 305, in which apps can be browsed, selected, and downloaded; also sometimes referred to as an "application store"). That is, while users can typically browse such "store" applications to select apps for download, the techniques described herein provide for a far more robust methodology of presenting apps that may be of interest to a user, without requiring that a user interact with a "store" app. For example, as mentioned above, advertisements for apps can be presented to users in any number of ways, such as through a social networking app, a gaming app, a web page, etc., and in accordance with the embodiments described herein, a given app can be installed directly from the advertisement, without having to interact with another application (e.g., a "store" app).

User interface 707 may include a selectable component, such as a button, a hyperlink, a menu item, etc. that includes the app ID for an app that has previously been registered with OAI system 310 (e.g., as discussed above with respect to FIGS. 5 and/or 6). As discussed below, the selectable component may be configured to communicate with app provider 315 (e.g., may include a URL that points to app provider 315).

In some embodiments, the selectable component may be associated with an advertisement (e.g., an advertisement for the app). One-touch API 712 may be an application, framework, or other software process that is executed by user device 305. One-touch API 712 may communicate with user interface 707, app provider 315, as well as an operating system and/or kernel of user device 305.

Process 700 may include receiving (at 705) a request to install the app. For example, user interface 707 may receive the request by a user selecting the selectable component (e.g., using his or her finger to touch a touchscreen of user device 305, indicating that the selectable component has been selected). This selection may be the only user interaction needed to install the app (as mentioned above in FIG. 1). Based on receiving the selection, user interface 707 may output a request to app provider 315 (e.g., may follow the URL or other link presented via user interface 707). The request may include the app ID, as well as an identifier of user device 305 (e.g., an IP address of user device 305, an International Mobile Subscriber Identity ("IMSI") value, an International Mobile Station Equipment Identity ("IMEI"), a mobile directory number ("MDN"), and/or some other identifier). The request (sent at 710) may be, or include, a HyperText Transfer Protocol ("HTTP") message that includes the app ID and the device ID as parameters. In some embodiments, the request may utilize some other suitable messaging protocol that allows the app ID and device ID to be included.

Based on receiving the request, app provider 315 may identify the app installation package installation URL associated with the app (e.g., as received at 630 in the case where the app installation package is stored by OAI system 310, or a URL to external app repository 320 in scenarios where OAI system 310 does not store the app installation package). App provider 315 may output (at 715) the app ID, the device ID, and the app installation package URL to OAI system 310. App provider 315 may also include authentication information to allow OAI system 310 to authenticate app provider 315, such as the one-touch app system key (e.g., as described above with respect to FIG. 5).

OAI system 310 may receive the information provided by app provider 315, and may authenticate app provider 315 using the authentication information (e.g., the one-touch app system key). OAI system 310 may also identify the checksum associated with the app ID (e.g., as received at 605), and output (at 720) a push notification to one-touch API 712. For instance, OAI system 310 may use the device ID (provided at 715) to identify user device 305 in order to provide the push notification. In some embodiments, one-touch API 712 may have registered with a push notification service using the device ID, which may facilitate the push notification being sent (at 720). The push notification may include the app installation package URL (provided at 715), and the checksum.

One-touch API 712 may use the app installation package URL to obtain (at 725) the app installation package from app repository 717. App repository 717, as discussed herein, may represent a repository included in or associated with OAI system 310, or may represent external app repository 320, in varying embodiments. One-touch API 712 may verify (at 730) the app installation package using the checksum (provided via the push notification at 720). Once one-touch API 712 has verified the app installation package, one-touch API 712 may install the app on user device 305. For instance, one-touch API 712 may have appropriate permissions to instruct an operating system and/or kernel of user device 305 to install the app.

Figure 8:
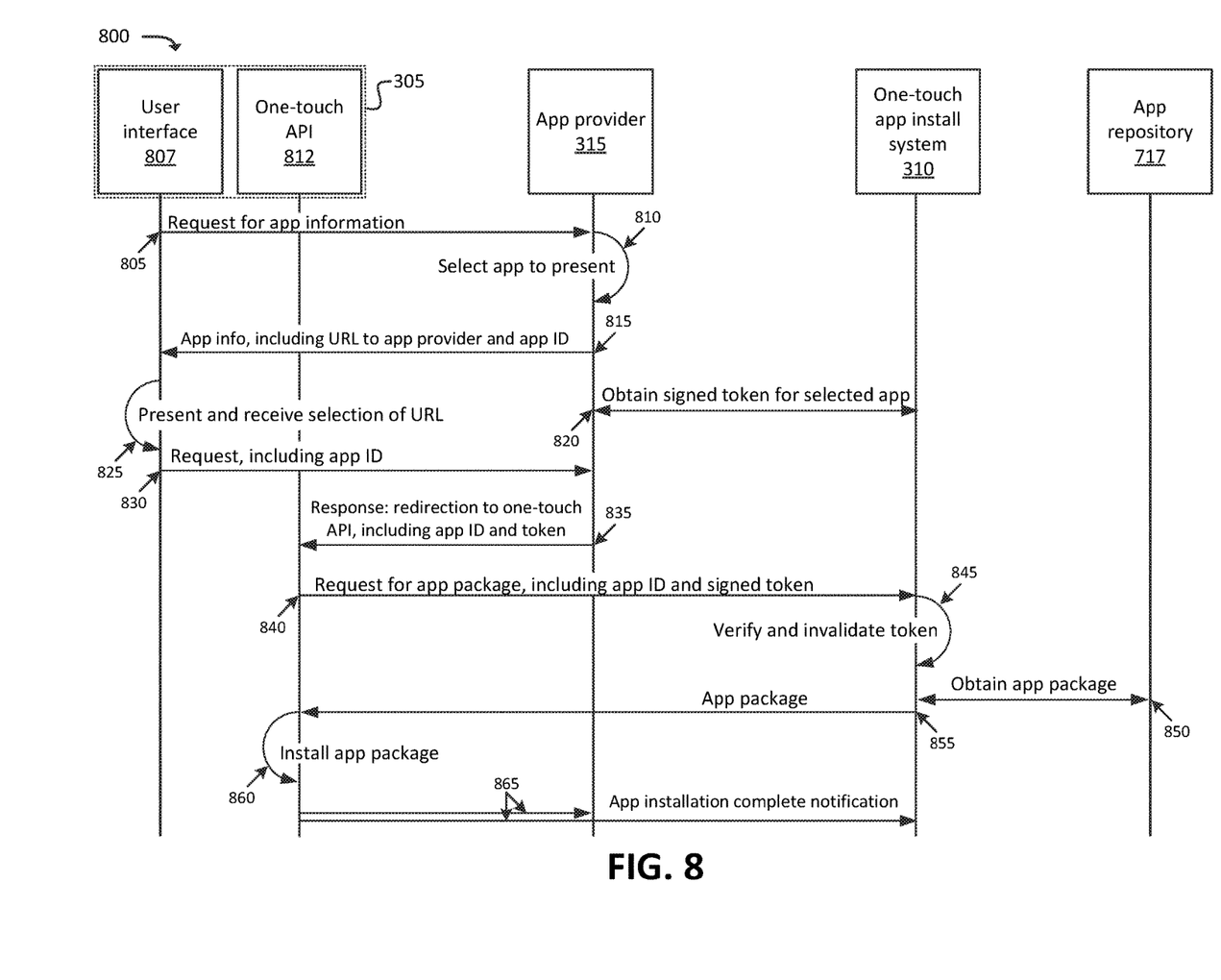

FIG. 8 illustrates another example process 800, according to some embodiments, for obtaining and installing an app based on a single user interaction. As shown, user interface 807 and one-touch API 812 may be running on user device 305 (e.g., may be software processes being executed by user device 305). User interface 807 may be configured to communicate with app provider 315 (e.g., may be pre-programmed by a developer of user interface 807 to communicate with app provider 315 via a URL associated with app provider 315 or some other suitable messaging technique).

As shown, user interface 807 may output (at 805) a request for app information to app provider 315. For example, user interface 807 may output the request when an application associated with user interface 807 is first opened. For instance, assuming that user interface 807 is associated with a web page, user interface 807 may output (at 805) the request when the web page is loaded or rendered by a web browser of user device 305. As another example, assuming that user interface 807 is associated with a social networking app associated with user device 305, user interface 807 may output the request when the social networking app begins being executed by user device 305. In some embodiments, user interface 807 may output the request based on other factors, such as a location of user device 305 (e.g., a location determination component of user device 305 may notify user interface 807 regarding the present or past location of user device 305), on a periodic or intermittent basis, and/or some other suitable factor. The request may include identification information regarding user device 305 or a user of user device 305, such as an IP address of user device 305, an IMSI or IMEI value of user device 305, a name of the user of user device 305, an identifier of the user, or the like.

App provider 315 may select (at 810) an app to present via user interface 807, based on receiving the request. For instance, app provider 315 may identify an app that may be of interest to the user based on user demographics, location, and/or any other suitable information. When selecting the app to present, app provider 315 may identify an app ID associated with the selected app (e.g., as received at 415 and/or 630). As discussed below, app provider 315 may also generate or identify a URL that user interface 807 can use to indicate, to app provider 315, that the app should be provided to user device 305. In some embodiments, the URL may include the app ID as a parameter. In some embodiments, selecting the app may also include identifying an advertisement and/or other information that should be presented by user interface 807. For instance, app provider 315 may identify one or more images, text, video content, etc. to be presented by user interface 807. In some embodiments, the advertisement and/or other information may be personalized based on the identity of user device 305 and/or the user of user device 305 (e.g., may include a name of the user, may be targeted advertising based on the user's demographics, etc.).

App provider 315 may output (at 815) information regarding the selected app, including the URL and the app ID. In embodiments where the app ID is not included as a parameter of the app ID, app provider 315 may provide the app ID using some other suitable technique. App provider 315 may also output the identified advertisement and/or other information to user interface 807.

App provider 315 may also obtain (at 820) a signed token for the selected app, from OAI system 310. For example, app provider 315 may indicate that the app has been selected, and OAI system 310 may generate the signed token for the selected app. In some embodiments, app provider 315 may include authentication information when requesting the signed token (e.g., a one-touch app system key, as discussed with respect to FIG. 4). In some embodiments, OAI system 310 may record the request, from app provider 315, for billing purposes (e.g., may bill app provider 315 for each signed token that was generated, for each app that was ultimately installed by user device 305 using the signed token, etc.). The signature of the token may be associated with private key stored by OAI system 310.

User interface 807 may present (at 825) information regarding the selected app. For instance, user interface 807 may present the advertisement and/or other information provided by app provider 315. User interface 807 may present a selectable component (e.g., a button, a hyperlink, etc.) that is associated with the received URL and app ID. User interface 807 may receive (at 825) a selection of the selectable component (e.g., the user of user device 305 may touch a touchscreen signifying a selection of the selectable component, may use an input device (such as a mouse or stylus) to "click" the selectable component, etc.).

User interface 807 may output (at 830) a request, to app provider 315, for the app. The request may be made by using the URL provided by app provider 315. As mentioned above, the URL may include the app ID as a parameter. In embodiments where the app ID is not included as a parameter, the request may include suitable messaging protocols such that the app ID is provided to app provider 315 along with the request. In some embodiments, the request may be, or include, an HTTP GET request or an HTTP POST request.

App provider 315 may receive the request (e.g., as an HTTP GET or POST request), and may respond to the request by redirecting (at 835) the request to one-touch API 812. In responding to the request, app provider 315 may further include the signed token (e.g., as a parameter in the redirected request). More specifically, for example, app provider 315 may redirect the request to a specific domain name or IP address that is interpreted by user device 305 (e.g., by a network stack of user device 305) as pointing to one-touch API 812. For instance, an operating system and/or kernel of user device 305 may have been previously configured to forward HTTP traffic, that is directed to the specified domain name or IP address, to one-touch API 812. In this manner, one-touch API 812 may essentially act as an HTTP proxy for HTTP traffic that is directed to the specified domain name or IP address.

One-touch API 812 may receive the redirected request, including the app ID and the signed token. Based on receiving the redirected request, one-touch API 812 may output (at 840) a request for an app installation package associated with the selected app. For instance, one-touch API 812 may be preconfigured to communicate with OAI system 310 (e.g., via a pre-stored URL associated with OAI system 310, and/or some other identifier or address via which one-touch API 812 can communicate with OAI system 310 using a suitable messaging protocol). The request (made at 840) may include the app ID and the signed token.

OAI system 310 may verify (at 845) the signed token (e.g., using a private key, as mentioned above). Once verified, OAI system 310 may invalidate the token so that it cannot be used again. In this manner, the token may be considered a "one-time use" token. In some embodiments, OAI system 310 may store a record indicating that the token has been used and/or consumed. This record may be used for, for instance, billing purposes (e.g., for billing app provider 315 based on the use of the token).

OAI system 310 may obtain (at 850) an app installation package from app repository 717. As similarly described above, app repository 717 may be an "internal" repository associated with OAI system 310, or may be external app repository 320 (e.g., which is accessible via a URL or other communication technique). In response to the request from one-touch API 812, OAI system 310 may provide (at 855) the app installation package to one-touch API 812. As similarly mentioned above with respect to one-touch API 712, one-touch API 812 may be configured with appropriate permissions with an operating system and/or kernel of user device 305 to install (at 860) the app on user device 305, using the app installation package. Once the app has been installed, one-touch API 812 may notify (at 865) app provider 315 and/or OAI system 310 that the app has been installed.

Figure 9:
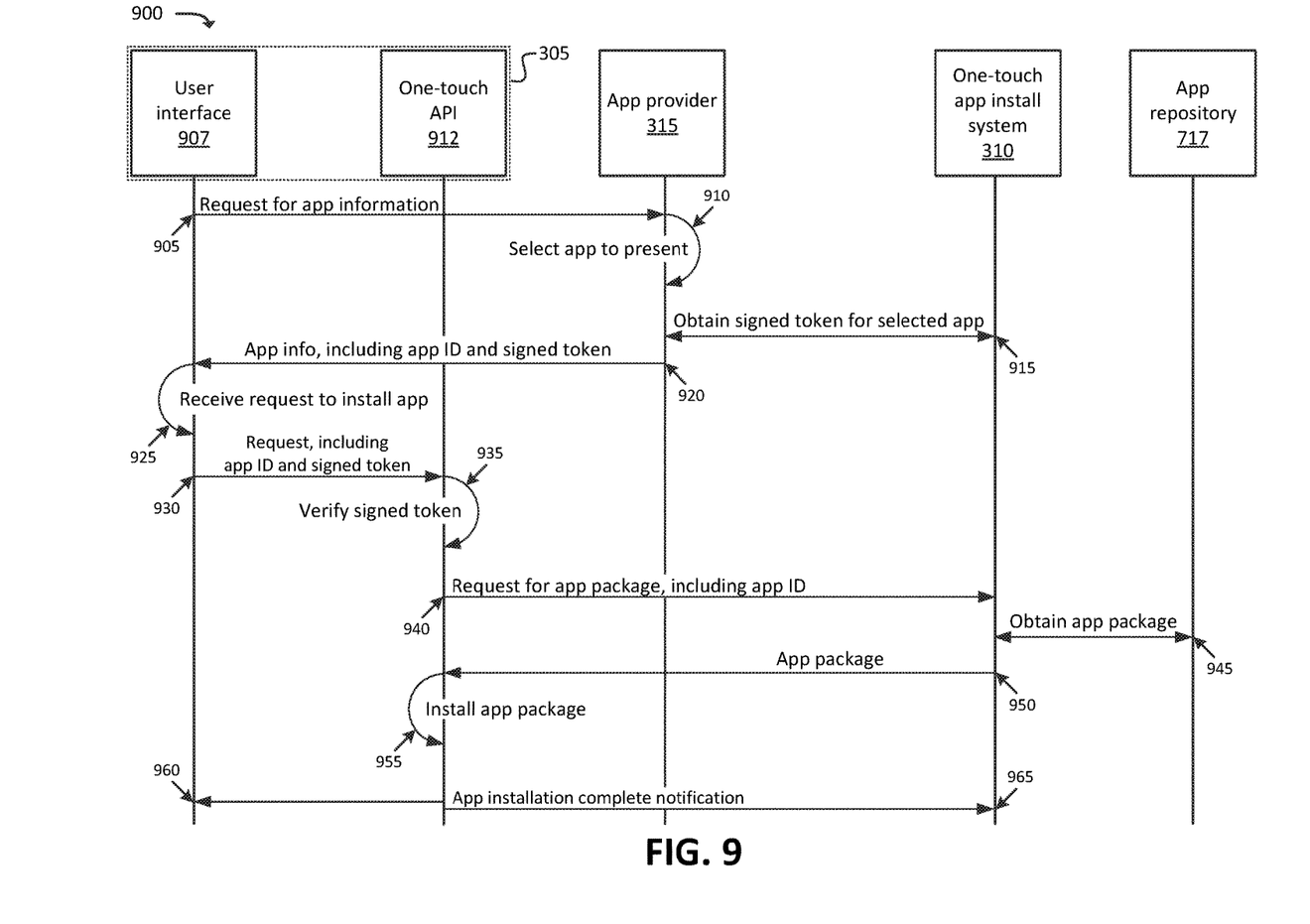

FIG. 9 illustrates another example process 900, according to some embodiments, for obtaining and installing an app based on a single user interaction. As shown, user interface 907 and one-touch API 912 may be running on user device 305 (e.g., may be software processes being executed by user device 305). User interface 907 may be configured to communicate with app provider 315 (e.g., may be preprogrammed by a developer of user interface 907 to communicate with app provider 315 via a URL associated with app provider 315 or some other suitable messaging technique). Similar to signals 805, 810, and 815, user interface 907 may output (at 905) a request for app information to app provider 315, app provider 315 may select (at 910) an app to present to user device 305, and app provider 315 may obtain (at 915) a signed token for the selected app from OAI system 310. As similarly mentioned above, selecting the app (at 910) may further entail selecting content to present with the app, such as an advertisement or other content.

App provider 315 may output (at 920) information regarding the selected app, including the app ID and the signed token. In some embodiments, app provider 315 may also output the additional content (e.g., the advertisement and/or other identified content).

User interface 907 may present information regarding the selected app. For instance, user interface 907 may present the advertisement and/or other content provided by app provider 315. User interface 907 may present a selectable component (e.g., a button, a hyperlink, etc.) that is associated with the selected app.

User interface 907 may receive (at 925) a request to install the app (e.g., may receive a selection of the selectable component). In some embodiments, user interface 907 may be configured to communicate with one-touch API 912. For example, an operating system and/or kernel of user device 305 may allow communication between different software processes, which allows user interface 907 and one-touch API 912 to communicate. In this sense, while user interface 907 may be developed by one entity and one-touch API 912 may be developed by another entity, user interface 907 and one-touch API 912 may still be able to communicate with each other (e.g., user interface 907 may implement calls, methods, subroutines, or other processes associated with one-touch API 912). In some embodiments, user interface 907 and one-touch API 912 may be implemented as a single software process or application, and thus the communications shown in FIG. 9, between user interface 907 and one-touch API 912, may represent intra-process communications.

Based on receiving the request to install the app (at 925), user interface 907 may output (at 930) a request to one-touch API 912, including the app ID and the signed token. In some embodiments, one-touch API 912 may store a private key that enables to one-touch API 912 to verify (at 935) the signed token. Based on receiving the request and verifying the token, one-touch API 912 may output (at 940) a request, to OAI system 310, for an app installation package associated with the app ID indicated in the request from user interface 907.

OAI system 310 may obtain (at 945) the requested app installation package from app repository 717. As similarly described above, app repository 717 may be an "internal" repository associated with OAI system 310, or may be external app repository 320 (e.g., which is accessible via a URL or other communication technique). In response to the request from one-touch API 912, OAI system 310 may provide (at 950) the app installation package to one-touch API 912. As similarly mentioned above with respect to one-touch API 712, one-touch API 912 may be configured with appropriate permissions with an operating system and/or kernel of user device 305 to install (at 955) the app on user device 305, using the app installation package. Once the app has been installed, one-touch API 912 may notify (at 960 and 965, respectively) user interface 907 and OAI system 310 that the app has been installed. In some embodiments, user interface 907 may present a notification that the app has been installed (e.g., via a graphical "pop-up" notification or some other notification).

Figure 10:
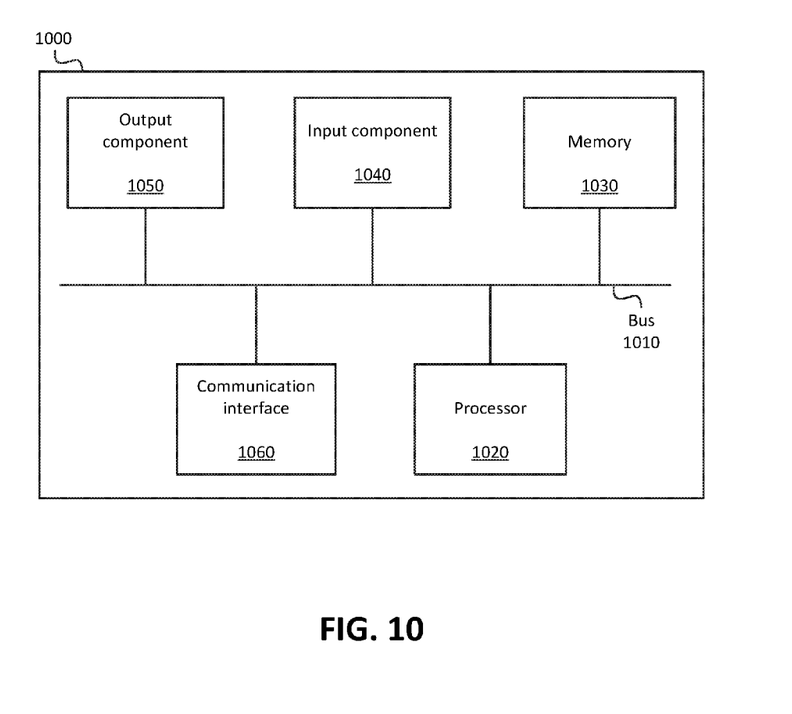
FIG. 10 illustrates example components of one or more devices, according to one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as an input component of a touchscreen display, keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while embodiments have been described above in the context of a "single touch" (or "one touch") being considered a "single user interaction," it is to be understood that other types of interactions that include multiple touches, gestures, selections, etc. may be considered as a "single user interaction." For example, a double click, a triple click, a swipe, a pinch, a menu selection, and/or other types of user interactions may be considered a "single user interaction" when such interactions correspond to an indication that a user has selected or opted to download and install an app, without needing to provide additional input, confirmations, etc.

In some embodiments, a "single user interaction" may be considered as a single input to a graphical, audible, haptic, or other type of user interface element according to how the user interface element is designed. For example, double clicking an icon that performs no function if it is single clicked, but performs its designed function if double clicked, may be considered a "single user interaction." For example, referring to FIG. 1, a "double click" or "double tap" of the "Download App_A" button may be considered to be a "single user interaction." In contrast, the selections shown in FIG. 2 may not be considered to be a "single user interaction" because, for example, the user is prompted for additional input after selecting (e.g., single clicking, double clicking, etc.) the "Download App_A" button. As another example, audibly speaking a phrase (e.g., "I want to download App A") may be considered a "single user interaction" if the phrase is interpreted as a command to initiate the downloading and installing of App_A. In some embodiments, an input may be considered as a "single user interaction" if no other input, information, confirmations, etc. are required from the user in order to install an app, after the initial selection has been made.

Furthermore, while the above description has been made in the context of a single user interaction, similar concepts may apply for processes that incorporate multiple user interactions. For example, similar concepts may apply if a user makes a selection to download and install an app, and a confirmation dialog is shown (e.g., "Do you wish to download and install this app?"). In some such embodiments, the concepts described herein may still apply, in that an application store app may not need to be launched, and/or the app may not need to be installed from the app store prior to the downloading and installation of the app.

Additionally, while series of signals have been described with regard to FIGS. 4-9, the order of the signals may be modified in other implementations. Further, non-dependent signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A user device, comprising:
   a non-transitory computer-readable medium storing a set of processor-executable instructions; and
   one or more processors configured to execute the set of processor-executable instructions, wherein executing the set of processor-executable instructions causes the one or more processors to:
      present a selectable component via a user interface associated with the user device, wherein the selectable component is associated with an application identifier of a first application;
      receive a selection of the selectable component, the selection being based on a user interaction by a user of the user device;
      output, based on receiving the selection, a first request to a first device, the first request including:
         the application identifier, and
         a user device identifier associated with the user device;
      receive and store information indicating that a second application, executed by the particular user device, acts as a proxy for one or more addresses;
      receive a response to the first request, wherein the response includes:
         a redirection instruction that identifies a particular address,
         the application identifier, and
         a token generated, signed, and stored by a second device,
         the token indicating that the first device has been authenticated by the second device;
      compare the particular address to the one or more addresses for which the second application acts as a proxy;

identify, based on the comparing, that the particular address is associated with the second application that is being executed by the user device;

based on the identifying that the particular address is associated with the second application, handle the redirection instruction by providing the application identifier and the signed token, received in response to the first request, to the second application;

output, by the second application, a second request to a second device, the second request including:
the application identifier, and
the signed token received in response to the first request,
wherein the second device outputs a third request for an installation package associated with the first application to a third device that is external to the user device, the first device, and the second device;

receive, in response to the second request, the installation package for the first application, wherein the signed token is verified and invalidated by the second device prior to the installation package being provided to the user device by the second device; and install, by the second application, the first application at the user device, using the installation package, wherein the second application has permissions from an operating system of the user device to install applications at the user device.

2. The user device of claim 1, wherein the first request includes a Hypertext Transfer Protocol ("HTTP") request, and wherein the response includes an HTTP redirect.

3. The user device of claim 1, wherein the selectable component is associated with a Uniform Resource Locator ("URL") that points to the first device, wherein the URL includes the application identifier as a parameter.

4. The user device of claim 1, wherein executing the processor-executable instructions to identify that the particular address is associated with the second application, provide the response to the second application, output the second request to the second device, and install the first application is performed independent of whether additional user interactions have been received by the user device, after the selection of the selectable component.

5. The user device of claim 1, wherein the user interface, via which the selectable component is presented, is not associated with an application store.

6. The user device of claim 1, wherein the selectable component is presented via at least one of:
a social networking application executed by the user device, or
a web page that is presented via a web browser executed by the user device.

7. A non-transitory computer-readable medium, storing a set of processor-executable instructions, which, when executed by one or more processors of a user device, cause the one or more processors to:

present a selectable component via a user interface associated with the user device, wherein the selectable component is associated with an application identifier of a first application;

receive a selection of the selectable component, the selection being based on a user interaction by a user of the user device;

output, based on receiving the selection, a first request to a first device, the first request including:
the application identifier, and
a user device identifier associated with the user device;

receive and store information indicating that a second application, executed by the particular user device, acts as a proxy for one or more addresses;

receive a response to the first request, wherein the response includes:
a redirection instruction that identifies a particular address,
the application identifier, and
a token, generated, signed, and stored by a second device, the token indicating that the first device has been authenticated by the second device;

compare the particular address to the one or more addresses for which the second application acts as a proxy;

identify, based on the comparing, that the particular address is associated with the second application that is being executed by the user device;

based on identifying that the particular address is associated with the second application, handle the redirection instruction by providing the application identifier and the signed token, received in response to the first request, to the second application;

output, by the second application, a second request to a second device, the second request including:
the application identifier, and
the signed token received in response to the first request,
wherein the second device outputs a third request for an installation package associated with the first application to a third device that is external to the user device, the first device, and the second device;

receive, in response to the second request, the installation package for the first application, wherein the signed token is verified and invalidated by the second device prior to the installation package being provided to the user device by the second device; and install, by the second application, the first application at the user device, using the installation package, wherein the second application has permissions from an operating system of the user device to install applications at the user device.

8. The non-transitory computer-readable medium of claim 7, wherein the first request includes a Hypertext Transfer Protocol ("HTTP") request, and wherein the response includes an HTTP redirect.

9. The non-transitory computer-readable medium of claim 7, wherein the selectable component is associated with a Uniform Resource Locator ("URL") that points to the first device, wherein the URL includes the application identifier as a parameter.

10. The non-transitory computer-readable medium of claim 7, wherein the processor-executable instructions, to identify that the particular address is associated with the second application, provide the response to the second application, output the second request to the second device, and install the first application, include processor-executable instructions to perform the identifying, providing, outputting, and installing independent of whether additional user interactions have been received by the user device, after the selection of the selectable component.

11. The non-transitory computer-readable medium of claim 7, wherein the user interface, via which the selectable component is presented, is not associated with an application store.

12. The non-transitory computer-readable medium of claim 7, wherein the selectable component is presented via at least one of:

a social networking application executed by the user device, or a web page that is presented via a web browser executed by the user device.

13. A method, comprising:

presenting, via a display component of a user device, a selectable component, wherein the selectable component is associated with an application identifier of a first application;

receiving, by the user device, a selection of the selectable component, the selection being based on a user interaction by a user of the user device;

outputting, by the user device and based on receiving the selection, a first request to a first device, the first request including:
the application identifier, and
a user device identifier associated with the user device;

receiving and storing, by the user device, information indicating that a second application, executed by the particular user device, acts as a proxy for one or more addresses;

receiving, by the user device, a response to the first request, wherein the response includes:
a redirection instruction that identifies a particular address,
the application identifier, and
a token, generated, signed, and stored by a second device, the token indicating that the first device has been authenticated by the second device;

comparing, by the user device, the particular address to the one or more addresses for which the second application acts as a proxy;

identifying, by the user device and based on the comparing, that the particular address is associated with the second application that is being executed by the user device;

based on identifying that the particular address is associated with the second application, handling, by the user device, the redirection instruction by providing the application identifier and the signed token, received in response to the first request, to the second application;

outputting, by the second application of the user device, a second request to a second device, the second request including:
the application identifier, and
the signed token received in response to the first request, wherein the second device outputs a third request for an installation package associated with the first application to a third device that is external to the user device, the first device, and the second device;

receiving, by the user device and in response to the second request, the installation package for the first application, wherein the signed token is verified and invalidated by the second device prior to the installation package being provided to the user device by the second device; and installing, by the second application of the user device, the first application at the user device, using the installation package, wherein the second application has permissions from an operating system of the user device to install applications at the user device.

14. The method of claim 13, wherein the first request includes a Hypertext Transfer Protocol ("HTTP") request, and wherein the response includes an HTTP redirect.

15. The method of claim 13, wherein the selectable component is associated with a Uniform Resource Locator ("URL") that points to the first device, wherein the URL includes the application identifier as a parameter.

16. The method of claim 13, wherein identifying that the particular address is associated with the second application, providing the response to the second application, outputting the second request to the second device, and installing the first application are performed independent of whether additional user interactions have been received by the user device, after the selection of the selectable component.

17. The method of claim 13, wherein the user interface, via which the selectable component is presented, is not associated with an application store.

18. The method of claim 13, wherein the selectable component is presented via at least one of:
a social networking application executed by the user device, or
a web page that is presented via a web browser executed by the user device.

19. The method of claim 13, wherein the signed token is invalidated by the second device after outputting the signed token to the second device.

20. The user device of claim 1, wherein the signed token is invalidated by the second device after the signed token is outputted to the second device.

* * * * *